United States Patent
Simmons et al.

(10) Patent No.: US 10,281,921 B2
(45) Date of Patent: May 7, 2019

(54) AUTONOMOUS PARKING OF VEHICLES IN PERPENDICULAR PARKING SPOTS

(71) Applicant: Ford Global Technologies, LLC, Dearborn, MI (US)

(72) Inventors: Kyle Simmons, New Boston, MI (US); Li Xu, Northville, MI (US); Douglas Blue, Plymouth, MI (US); Hongtei Eric Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/723,104

(22) Filed: Oct. 2, 2017

(65) Prior Publication Data
US 2019/0101925 A1    Apr. 4, 2019

(51) Int. Cl.
*B62D 15/02*    (2006.01)
*G05D 1/02*    (2006.01)
*G05D 1/00*    (2006.01)

(52) U.S. Cl.
CPC ....... *G05D 1/0225* (2013.01); *B62D 15/0285* (2013.01); *G05D 1/0088* (2013.01); *G05D 1/0231* (2013.01); *G05D 1/0255* (2013.01); *G05D 1/0257* (2013.01); *G05D 2201/0213* (2013.01)

(58) Field of Classification Search
CPC .. G05D 1/0225; G05D 1/0231; G05D 1/0255; G05D 1/0257; B62D 15/0285
USPC .......................................................... 701/25
See application file for complete search history.

(56) References Cited

U.S. PATENT DOCUMENTS

| | | | |
|---|---|---|---|
| 6,356,828 B1 * | 3/2002 | Shimizu ............. | B62D 15/0285 180/168 |
| 6,476,730 B2 * | 11/2002 | Kakinami ............. | B60Q 9/005 340/435 |
| 6,657,555 B2 * | 12/2003 | Shimizu ................ | B60Q 9/005 180/204 |
| 6,683,539 B2 | 1/2004 | Trajkovic | |
| 6,724,322 B2 | 4/2004 | Tang | |
| 6,744,364 B2 | 6/2004 | Wathen | |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Tan Q Nguyen
(74) *Attorney, Agent, or Firm* — Frank Lollo; James P. Muraff; Neal, Gerber & Eisenberg LLP

(57) ABSTRACT

Method and apparatus are disclosed for autonomous parking of vehicles in perpendicular parking spots. An example vehicle includes a front corner, a sensor, and a parking controller. The parking controller is to detect, via the sensor, a perpendicular parking spot and determine a linear parking path located within the perpendicular parking spot along which the front corner is to travel. The parking controller also is to determine an approaching turn path to the linear parking path and autonomously turn along the approaching turn path and the linear parking path into the perpendicular parking spot.

20 Claims, 8 Drawing Sheets

(56) References Cited

U.S. PATENT DOCUMENTS

| | | |
|---|---|---|
| 6,768,420 B2 | 7/2004 | McCarthy |
| 6,801,855 B1 | 10/2004 | Walters |
| 6,850,148 B2 | 2/2005 | Masudaya |
| 6,850,844 B1 | 2/2005 | Walters |
| 6,927,685 B2 | 8/2005 | Wathen |
| 7,042,332 B2 | 5/2006 | Takamura |
| 7,123,167 B2 | 10/2006 | Staniszewski |
| 7,663,508 B2 | 2/2010 | Teshima |
| 7,737,866 B2 | 6/2010 | Wu |
| 7,813,844 B2 | 10/2010 | Gensler |
| 7,825,828 B2 * | 11/2010 | Watanabe .............. B60Q 9/005 340/435 |
| 7,834,778 B2 | 11/2010 | Browne |
| 7,847,709 B2 | 12/2010 | McCall |
| 7,850,078 B2 | 12/2010 | Christenson |
| 8,035,503 B2 | 10/2011 | Partin |
| 8,054,169 B2 | 11/2011 | Bettecken |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,587,681 B2 | 11/2013 | Guidash |
| 8,594,616 B2 | 11/2013 | Gusikhin |
| 8,599,043 B2 | 12/2013 | Kadowaki et al. |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,233,710 B2 | 1/2016 | Lavoie |
| 9,273,966 B2 | 3/2016 | Bartels |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,469,247 B2 | 10/2016 | Juneja |
| 9,493,187 B2 | 11/2016 | Pilutti |
| 9,506,774 B2 | 11/2016 | Shutko |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 * | 9/2017 | Kim ................... G06K 9/00812 |
| 9,809,218 B2 | 11/2017 | Elie |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,975,504 B2 | 5/2018 | Dalke |
| 10,131,347 B2 | 11/2018 | Kim |
| 2003/0060972 A1 | 3/2003 | Kakinami |
| 2003/0098792 A1 | 5/2003 | Edwards |
| 2005/0030156 A1 | 2/2005 | Alfonso |
| 2005/0099275 A1 | 5/2005 | Kamdar |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0289813 A1 | 11/2009 | Kwiecinski |
| 2009/0313095 A1 | 12/2009 | Hurpin |
| 2010/0025942 A1 | 2/2010 | Von Rehyer |
| 2010/0114471 A1 | 5/2010 | Sugiyama |
| 2010/0114488 A1 | 5/2010 | Khamharn |
| 2010/0152972 A1 | 6/2010 | Attard |
| 2010/0156672 A1 | 6/2010 | Yoo |
| 2010/0259420 A1 | 10/2010 | Von Reyher |
| 2011/0071725 A1 | 3/2011 | Kleve |
| 2011/0082613 A1 | 4/2011 | Oetiker |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0073119 A1 | 3/2013 | Huger |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0096051 A1 | 4/2014 | Boblett |
| 2014/0121930 A1 | 5/2014 | Allexi |
| 2014/0147032 A1 | 5/2014 | Yous |
| 2014/0188339 A1 | 7/2014 | Moon |
| 2014/0222252 A1 | 8/2014 | Matters |
| 2014/0240502 A1 | 8/2014 | Strauss |
| 2014/0300504 A1 | 10/2014 | Shaffer |
| 2014/0303839 A1 | 10/2014 | Filev |
| 2014/0320318 A1 | 10/2014 | Victor |

(56) References Cited

U.S. PATENT DOCUMENTS

| | | |
|---|---|---|
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee et al. |
| 2015/0153178 A1 | 6/2015 | Koo |
| 2015/0161890 A1 | 6/2015 | Huntzicker |
| 2015/0163649 A1 | 6/2015 | Chen |
| 2015/0203111 A1 | 7/2015 | Bonnet |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0371541 A1 | 12/2015 | Korman |
| 2015/0375741 A1 | 12/2015 | Kiriya |
| 2015/0375742 A1 | 12/2015 | Gebert et al. |
| 2016/0012726 A1 | 1/2016 | Wang |
| 2016/0055749 A1 | 2/2016 | Nicoll |
| 2016/0062354 A1 | 3/2016 | Li |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0153778 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0236680 A1 | 8/2016 | Lavoie |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0304087 A1 | 10/2016 | Noh |
| 2016/0304088 A1 | 10/2016 | Barth |
| 2016/0321445 A1 | 11/2016 | Turgeman |
| 2016/0321926 A1 | 11/2016 | Mayer |
| 2016/0334797 A1 | 11/2016 | Ross |
| 2016/0349362 A1 | 12/2016 | Rohr |
| 2016/0355125 A1 | 12/2016 | Herbert |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan et al. |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0208438 A1 | 7/2017 | Dickow |
| 2017/0297385 A1 | 10/2017 | Kim |
| 2017/0301241 A1 | 10/2017 | Urhahne |
| 2017/0308075 A1 | 10/2017 | Whitaker |
| 2018/0024559 A1 | 1/2018 | Seo |
| 2018/0029591 A1 | 2/2018 | Lavoie |
| 2018/0039264 A1 | 2/2018 | Messner |
| 2018/0043884 A1 | 2/2018 | Johnson |
| 2018/0056939 A1 | 3/2018 | Van Roermund |
| 2018/0194344 A1 | 7/2018 | Wang |
| 2018/0236957 A1 | 8/2018 | Min |

FOREIGN PATENT DOCUMENTS

| | | |
|---|---|---|
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009051055 A1 | 7/2010 |
| DE | 102012008858 A1 | 11/2012 |
| DE | 102011122421 A1 | 6/2013 |
| DE | 102012200725 A1 | 7/2013 |
| DE | 102013004214 A1 | 9/2013 |
| DE | 102010034129 B4 | 10/2013 |
| DE | 102012215218 A1 | 6/2014 |
| DE | 102012222972 A1 | 6/2014 |
| DE | 102013213064 A1 | 1/2015 |
| DE | 102014009077 A1 | 2/2015 |
| DE | 102013016342 A1 | 4/2015 |
| DE | 102013019771 A1 | 5/2015 |
| DE | 102013019904 A1 | 5/2015 |
| DE | 102014007915 A1 | 12/2015 |
| DE | 102014011802 A1 | 2/2016 |
| DE | 102014111570 A1 | 2/2016 |
| DE | 102014015655 A1 | 4/2016 |
| DE | 102015209976 A1 | 12/2016 |
| DE | 102015221224 A1 | 5/2017 |
| DE | 102016011916 A1 | 6/2017 |
| DE | 102016125282 A1 | 7/2017 |
| DE | 102016211021 A1 | 12/2017 |
| EP | 2289768 A2 | 3/2011 |
| EP | 2295281 A1 | 3/2011 |
| EP | 2653367 A1 | 10/2013 |
| EP | 2768718 B1 | 3/2016 |
| EP | 2620351 B1 | 6/2016 |
| EP | 2135788 B1 | 6/2017 |
| GB | 2344481 A | 6/2000 |
| GB | 2481324 A | 6/2011 |
| GB | 2497836 A | 12/2012 |
| GB | 2517835 A | 3/2015 |
| JP | 2000293797 A | 10/2000 |
| JP | 2004142543 A | 5/2004 |
| JP | 2004287884 A | 10/2004 |
| JP | 2005193742 A | 7/2005 |

(56) References Cited

FOREIGN PATENT DOCUMENTS

| | | |
|---|---|---|
| JP | 2009090850 A | 4/2009 |
| JP | 2014125196 A | 7/2014 |
| JP | 2014134082 A | 7/2014 |
| JP | 5586450 B2 | 9/2014 |
| JP | 5918683 B2 | 5/2016 |
| JP | 2016119032 A | 6/2016 |
| KR | 20090040024 A | 4/2009 |
| KR | 20100006714 A | 1/2010 |
| KR | 20130106005 A | 9/2013 |
| KR | 20160039460 A | 4/2016 |
| KR | 20160051993 A | 5/2016 |
| WO | WO 2006/064544 A1 | 6/2006 |
| WO | WO 2008055567 A1 | 5/2008 |
| WO | WO 2010/006981 A1 | 1/2010 |
| WO | WO 2011/141096 A1 | 11/2011 |
| WO | WO 2013056959 A1 | 4/2013 |
| WO | WO 2013/123813 A1 | 8/2013 |
| WO | WO 2014/103492 A1 | 7/2014 |
| WO | WO 2015/068032 A1 | 5/2015 |
| WO | WO 2015/193058 A1 | 12/2015 |
| WO | WO 2016/046269 A1 | 3/2016 |
| WO | WO 2016/128200 A1 | 8/2016 |
| WO | WO 2016/134822 A1 | 9/2016 |
| WO | WO 2017/062448 A1 | 4/2017 |
| WO | WO 2017073159 A1 | 5/2017 |
| WO | WO 2017/096307 A1 | 6/2017 |
| WO | WO 2017/096728 A1 | 6/2017 |
| WO | WO 2017/097942 A1 | 6/2017 |
| WO | WO 2017/118510 A1 | 7/2017 |
| WO | WO 2017/125514 A1 | 7/2017 |

OTHER PUBLICATIONS

Perpendicular Parking—https://prezi.com/togmfyxriksl/perpendicular-parking/.

Automatically Into the Parking Space—https://www.mercedes-benz.com/en/mercedes-benz/next/automation/automatically-into-the-parking-space/; Oct. 27, 2014.

Search Report dated Oct. 10, 2018 for GB Patent Application No. 1806499.8 (4 pages).

Tesla Model S Owner's Manual v2018.44. Oct. 29, 2018.

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Bill Howard, Bosch's View of the Future Car: Truly Keyless Entry, Haptic Feedback, Smart Parking, Cybersecurity, Jan. 9, 2017, 8 Pages.

Core System Requirements Specification (SyRS), Jun. 30, 2011, Research and Innovative Technology Administration.

Daimler AG, Remote Parking Pilot, Mar. 2016 (3 Pages).

Jingbin Liu, (Parking: An Intelligent Indoor Location-Based Smartphone Parking Service, Oct. 31, 2012, 15 pages.

Land Rover develops a smartphone remote control for its SUVs, James Vincent, Jun. 18, 2015.

Search Report dated Jan. 19, 2018 for GB Patent Application No. 1711988.4 (3 pages).

Search Report dated Jul. 11, 2017 for GB Patent Application No. Enter U.S. Appl. No. 15/583,524, pp. 3

Search Report dated May 21, 2018 for Great Britain Patent Application No. GB 1800277.4 (5 Pages).

Search Report dated Nov. 28, 2017, for GB Patent Application No. GB 1710916.6 (4 Pages).

Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

AUTONOMOUS PARKING OF VEHICLES IN PERPENDICULAR PARKING SPOTS

CROSS-REFERENCE TO RELATED APPLICATIONS

This application is related to U.S. application Ser. No. 15/406,370, filed on Jan. 13, 2017, which is incorporated herein by reference in its entirety.

TECHNICAL FIELD

The present disclosure generally relates to autonomous parking and, more specifically, to autonomous parking of vehicles in perpendicular parking spots.

BACKGROUND

Oftentimes, vehicles include autonomous or semi-autonomous driving systems that enable the vehicles to be driven with reduced driver input. Typically, a vehicle with an autonomous or semi-autonomous driving system includes sensors that collect information of a surrounding environment of the vehicle. In such instances, the autonomous or semi-autonomous driving system performs motive functions (e.g., steering, accelerating, braking, etc.) based on the collected information. Some driving systems utilize information collected from sensors to autonomously or semi-autonomously park (e.g., parallel park) a vehicle in an available parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for autonomous parking of vehicles in perpendicular parking spots. An example disclosed vehicle includes a front corner, a sensor, and a parking controller. The parking controller is to detect, via the sensor, a perpendicular parking spot and determine a linear parking path located within the perpendicular parking spot along which the front corner is to travel. The parking controller also is to determine an approaching turn path to the linear parking path and autonomously turn along the approaching turn path and the linear parking path into the perpendicular parking spot.

An example disclosed method includes detecting a perpendicular parking spot via a camera of a vehicle and determining, via a processor, a linear parking path located within the perpendicular parking spot along which a front corner of the vehicle is to travel. The example disclosed method also includes determining, via the processor, an approaching turn path to the linear parking path and autonomously turning along the approaching turn path and the linear parking path into the perpendicular parking spot.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
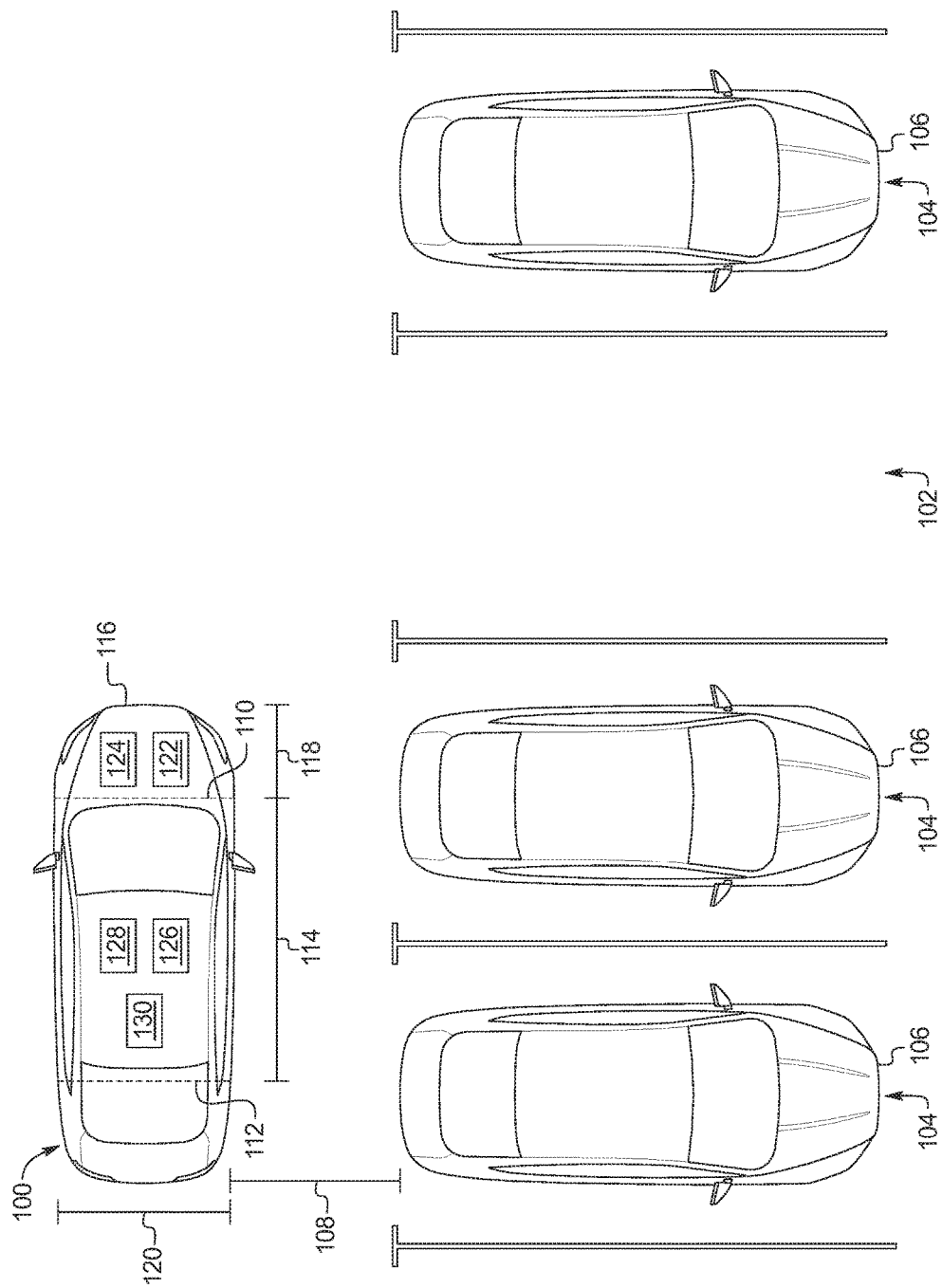
FIG. 1 illustrates an example vehicle approaching a perpendicular parking spot.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include autonomous or semi-autonomous driving systems that enable the vehicles to be driven with reduced driver input. Generally, a vehicle with such a driving system includes sensors that collect information of a surrounding environment of the vehicle. In such instances, the driving system performs motive functions (e.g., steering, accelerating, braking, etc.) based on the collected information. For example, the vehicle may include a sensor to detect nearby objects to enable the driving system to avoid such objects.

Some driving systems also utilize the collected information to autonomously or semi-autonomously park a vehicle in an available parking spot. For example, such driving systems are utilized to park a vehicle in a parallel parking spot, a diagonal parking spot, a perpendicular parking spot, etc. In some instances in which an autonomous or semi-autonomous driving system is utilized to park in a perpendicular parking spot, the driving system potentially requires a readjustment maneuver to be performed within the perpendicular parking spot and/or an increased passing distance between the vehicle and the perpendicular parking spot to enable the vehicle to be parked in the perpendicular parking spot.

Example methods, apparatus, and computer readable media autonomously turn a vehicle into a perpendicular parking spot such that a front corner of the vehicle travels along a linear parking path within perpendicular parking spot to reduce a passing distance between the vehicle and the perpendicular parking spot, to reduce a width of the perpendicular parking spot in which the vehicle is able to be parked, and/or to avoid performing a readjustment maneuver within the perpendicular parking spot.

Example vehicles disclosed herein include an parking controller and a camera and/or a sensor. The parking controller autonomous parks the vehicle in a parking spot. As used herein, "autonomous parking" refers to a form of autonomous driving in which motive actions of a vehicle (e.g., steering, turning, accelerating, decelerating, etc.) are controlled by the vehicle without direct driver input to park the vehicle in a parking spot. As used herein, "autonomous driving" refers to a vehicle-maneuvering system in which motive actions of a vehicle (e.g., steering, accelerating, decelerating, etc.) are controlled by the vehicle without direct driver input. As used herein, "semi-autonomous driving" refers to a vehicle-maneuvering system in which some routine motive actions of a vehicle are controlled by the vehicle without direct driver input. As used herein, "autonomous turning" refers to a sequence of autonomous parking, autonomous driving, and/or semi-autonomous driving in which turning of a vehicle is controlled by the vehicle without direct driver input.

The parking controller of the examples disclosed herein detect, via the camera and/or the sensor, a perpendicular parking spot and an outer boundary of the perpendicular parking spot. As used herein, a "perpendicular parking spot" refers to a parking spot for a vehicle of which an outer boundary is perpendicular to an adjacent designated direction of travel of the vehicle.

For example, the parking controller determines, based on the outer boundary, a linear parking path located within the perpendicular parking spot and autonomously turns the vehicle into the perpendicular parking spot such that a front corner of the vehicle travels along the linear parking path. In some examples, the parking controller determines the linear parking path to be offset and parallel to the outer boundary of the perpendicular parking spot. As used herein, a "linear parking path" refers to a linear path along which a portion of a vehicle (e.g., a front corner) travels as the vehicle enters a parking spot. As used herein, a "front corner" of a vehicle refers to a portion of the vehicle at which a front surface and a side surface of the vehicle converge. For example, a vehicle includes a left, front corner and a right, front corner. In some examples, a front corner of a vehicle includes a curved surface that connects the front surface and the side surface of the vehicle. By autonomously turning the vehicle so that the front corner travels along the linear parking path in a single forward motion, the parking controller reduces a passing distance between the vehicle and the perpendicular parking spot, reduces a width of the perpendicular parking spot in which the parking controller is able to park the vehicle, and/or prevents the vehicle from having to perform a readjustment maneuver within the perpendicular parking spot. As used herein, a "passing distance" refers to a distance between a vehicle and a row of perpendicular parking spots before the vehicle turns into an available one of the perpendicular parking spots. As used herein, a "readjustment maneuver within a parking spot" refers a sequence in which, upon at least partially entering a parking spot (e.g., a perpendicular parking spot), a vehicle performs an outward motion (e.g., a reverse motion) from the parking spot and subsequently performs an inward motion (e.g., a forward motion) into the parking spot to readjust a position of the vehicle within the parking spot. In other examples, the parking controller determines a linear parking path located within the perpendicular parking spot and autonomously turns the vehicle into the perpendicular parking spot such that a rear corner of the vehicle travels along the linear parking path in a single reverse motion.

In some examples, the parking controller identifies a target parking position located within the perpendicular parking spot. In such examples, the parking controller determines the linear parking path based on the outer boundary of the perpendicular parking spot and the target parking position. As used herein, a "target parking position" refers to a position located at which an parking controller intends to park within a parking spot.

Further, when determining the linear parking path, the parking controller identifies a first end and a second end opposite the first end of the linear parking path. In some examples, the parking controller determines the first end of the linear parking path based on the target parking position and a minimum turning radius of the vehicle. For example, the parking controller autonomously turns the vehicle at the minimum turning radius between the first end of the linear parking path and the target parking position. As used herein, a "minimum turning radius" refers to a smallest turning radius that a vehicle is physically capable of making. The parking controller also determines the second end of the linear parking path based on the outer boundary of the perpendicular parking spot. For example, the parking controller determines an orientation at which the vehicle is to be positioned at the second end of the linear parking path based on the target parking position, the minimum turning radius, and a length of the linear parking path.

The parking controller of examples disclosed herein also determines an approaching turn path to the linear parking path located within the perpendicular parking spot. For example, the approaching turn path determined by the parking controller extends between a current position of the vehicle and the orientation at which the vehicle is to be positioned at the second end of the linear parking path that enables the front corner of the vehicle to travel along the linear parking path. Upon determining the linear parking path and the approaching turn path to the linear parking path, the parking controller autonomously turns the vehicle along the approaching turn path and the linear parking path to the target parking position to park the vehicle within the perpendicular parking spot without having to perform a readjustment maneuver within perpendicular parking spot. For example, the approaching turn path that enables the vehicle to enter the perpendicular parking spot along the linear parking path includes a 1-point turn, a 2-point turn, a 3-point turn, etc.

Turning to the figures, FIG. 1 illustrates an example vehicle 100 approaching a perpendicular parking spot 102 that is unoccupied. As illustrated in FIG. 1, the perpendicular parking spot 102 is positioned between other perpendicular parking spots 104 that are occupied by other respective vehicles 106.

The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 is spaced apart from the perpendicular parking spots 102, 104 by a passing distance 108. Further, as illustrated in FIG. 1, a front axle 110 and a rear axle 112 of the vehicle 100 are spaced apart by a distance 114 (e.g., a first distance). The front axle 110 and a front side 116 of the vehicle (e.g., including a front corner 208 of FIGS. 2-4) are spaced apart by a distance 118 (e.g., a second distance). Additionally, the vehicle 100 has a width 120. For example, the distance 114 between the front axle 110 and the rear axle 112, the distance 118 between the front axle 110 and the front corner, the width 120 of the vehicle 100, and/or a road wheel angle of the vehicle 100 defines a minimum turning radius of the vehicle 100. The road wheel angle or camber angle is an angle formed between vertical axes of wheels of the vehicle 100 and a surface on which the vehicle 100 is positioned.

As illustrated in FIG. 1, the vehicle 100 includes a camera 122, a sensor 124, a magnetometer 126, and a global positioning system (GPS) receiver 128. For example, the camera 122 is positioned toward the front side 116 of the vehicle 100 to monitor and/or collect information on the perpendicular parking spots 102, 104 that the vehicle 100 is approaching. Additionally or alternatively, the vehicle 100 utilizes the sensor 124 to monitor and/or collect information (e.g., positions, outer boundaries, etc.) on the perpendicular parking spots 102, 104. For example, the sensor 124 may include lidar sensor (e.g., a lidar sensor 516 of FIG. 5), a radar sensor (e.g., a radar sensor 518 of FIG. 5), an ultrasonic sensor (e.g., an ultrasonic sensor 520 of FIG. 5), and/or any other sensor capable of monitoring and/or collecting information on the perpendicular parking spots 102, 104. The magnetometer 126 measures a magnetic orientation of the vehicle 100 and/or a direction in which the vehicle 100 is moving. Further, the GPS receiver 128 communicates with (e.g., transmits signal to, receives signals from) a global positioning system to monitor a location of the vehicle 100.

The vehicle 100 also includes an parking controller 130 that autonomously parks the vehicle in unoccupied parking spots such as the perpendicular parking spot 102. For example, the parking controller 130 can be implemented in a full-active park-assist system in which braking, accelerating, and steering are autonomously operated and/or in a semi-active park-assist system in which steering is autonomously operated and accelerating and braking are user operated. The parking controller 130 autonomously parks the vehicle 100 within the perpendicular parking spot 102 along an approaching turn path (e.g., an approaching turn path 402 of FIG. 4, an approaching turn path 502 of FIG. 5, an approaching turn path 602 of FIG. 6, an approaching turn path 702 of FIG. 7) and a linear parking path within the perpendicular parking spot 102 (e.g., a linear parking path 202 of FIGS. 2-7) to reduce a passing distance (e.g., the passing distance 108) from which the vehicle 100 is able to park in the perpendicular parking spot 102, to reduce, a width of a perpendicular parking spot in which the vehicle 100 is able to park, and/or to prevent the vehicle 100 from performing a readjustment maneuver within the perpendicular parking spot 102.

Figure 2:
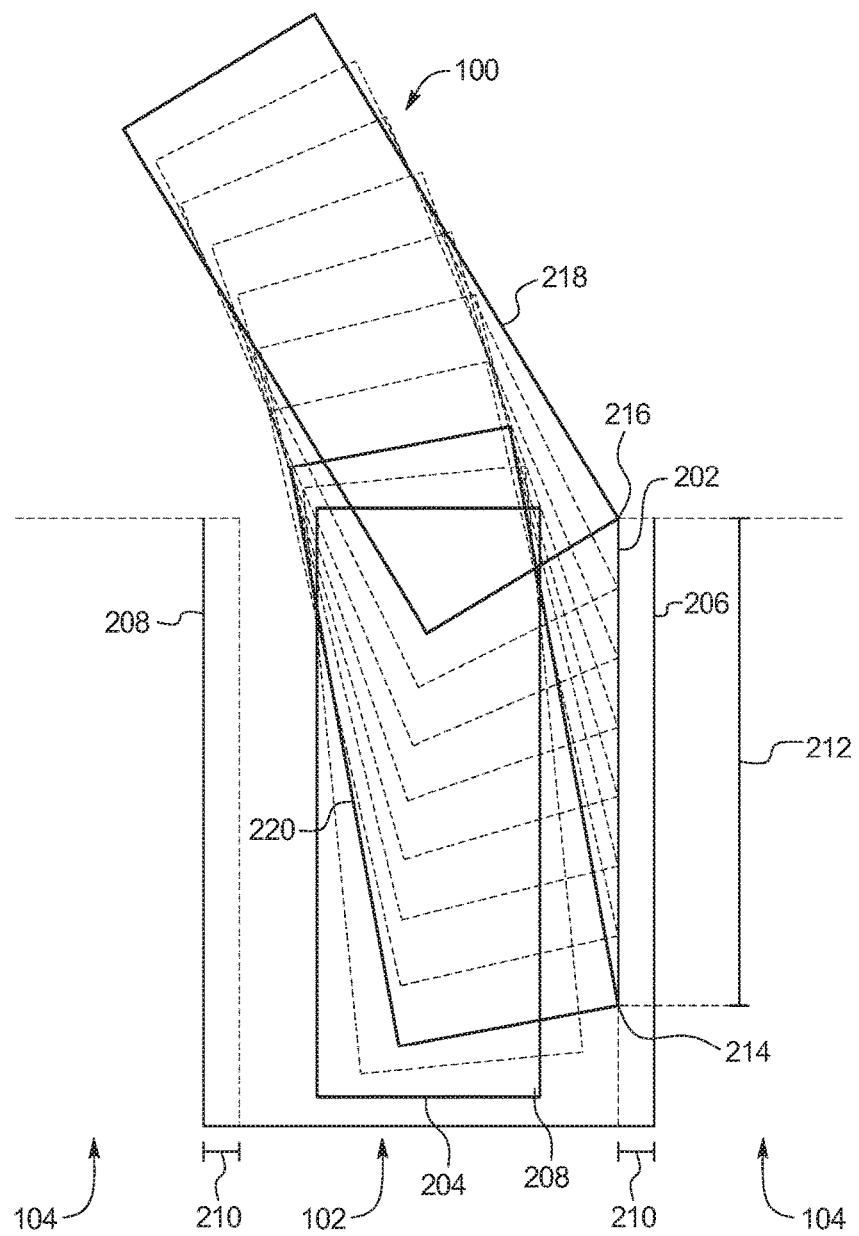
FIG. 2 depicts the vehicle of FIG. 1 traveling along a linear parking path to park in the perpendicular parking spot of FIG. 1 in accordance with the teachings herein.

FIG. 2 depicts the vehicle 100 traveling along a linear parking path 202 to park at a target parking position 204 within the perpendicular parking spot 102 in accordance with the teachings herein.

Prior to turning along the linear parking path 202, the parking controller 130 detects the perpendicular parking spot 102 and determines that the perpendicular parking spot 102 is unoccupied based on the information collected via the camera 122 and/or the sensor 124 of the vehicle 100. Additionally, the parking controller 130 detects an outer boundary 206 of the perpendicular parking spot 102 and identifies the target parking position 204 within the perpendicular parking spot 102 based on the information collected via the camera 122 and/or the sensor 124. For example, the vehicle 100 is positioned completely within the perpendicular parking spot 102 when the vehicle 100 is at the target parking position 204.

Further, based on the target parking position 204 and the outer boundary 206 of the perpendicular parking spot 102, the parking controller 130 determines the linear parking path 202 along which the front corner 208 of the vehicle 100 is to travel. In the illustrated example, the parking controller 130 determines the linear parking path 202 to be offset from and parallel to the outer boundary 206 such that the linear parking path 202 is located within the perpendicular parking spot 102. For example, the linear parking path 202 is spaced apart from the outer boundary 206 by a buffer distance 210 to deter the vehicle 100 from encroaching the other perpendicular parking spots 104 that is adjacent to the outer boundary 206.

When determining the linear parking path 202, the parking controller 130 determines a length 212, a first end 214, and a second end 216 opposite the first end 214 of the linear parking path 202. In some examples, the parking controller 130 is to autonomously turn the vehicle 100 at its minimum turning radius as the vehicle 100 travels from the first end 214 of the linear parking path 202 to the target parking position 204. In such examples, the parking controller 130 determines a location of the first end 214 of the linear parking path 202 based on the target parking position 204 and the minimum turning radius of the vehicle 100.

Additionally, the parking controller 130 determines a location of the second end 216 of the linear parking path 202 that enables the front corner 208 of the vehicle 100 to travel along the linear parking path 202 as the vehicle 100 approaches the target parking position 204. In such examples, the parking controller 130 determines the location of the second end 216 based on the outer boundary 206 (e.g., a length of the outer boundary 206) of the perpendicular parking spot 102, the target parking position 204, and/or the minimum turning radius of the vehicle 100. Based on the location of the first end 214 and the location of the second end, the parking controller 130 determines the length 212 of the linear parking path 202.

Further, the parking controller 130 determines orientations at which the vehicle 100 is to be positioned at respective locations along the linear parking path 202 that enable the front corner 208 of the vehicle 100 to travel along the linear parking path 202 as the vehicle 100 approaches the target parking position 204. For example, the parking controller 130 determines a first orientation for a first intermediate position 218 of the vehicle 100 when the front corner 208 is at the first end 214, a second orientation for a second intermediate position 220 of the vehicle 100 when the front corner 208 is at the second end 216, and orientations for other intermediate positions of the vehicle 100 between the first intermediate position 218 and the second intermediate position 220.

In some examples, the parking controller 130 determines the orientations at which the vehicle 100 is to be positioned along the linear parking path 202 based on the target parking position 204, the minimum turning radius of the vehicle 100, and/or the length 212 of the linear parking path 202. For example, the parking controller 130 determines the first orientation at the first intermediate position 218 based on the target parking position 204 and the minimum turning radius at which the vehicle 100 turns between the target parking position 204 and the first intermediate position 218. Subsequently, the parking controller 130 determines an orientation of an adjacent intermediate position along the linear parking path 202 based on the first orientation at the first intermediate position 218, the minimum turning radius, and a distance between the first intermediate position 218 and the adjacent intermediate position. In a similar manner, the parking controller 130 determines an orientation for each position along the linear parking path 202 to the second intermediate position 220. In other examples, the parking controller 130 queries a lookup table for the orientations at which the vehicle 100 is to be positioned along the linear parking path 202. In such examples, the parking controller 130 queries the lookup table based on the target parking position 204, the minimum turning radius of the vehicle 100, and/or the length 212 of the linear parking path 202 determined by the parking controller 130.

Based on the orientations at which the vehicle 100 is to be positioned along the linear parking path 202, the parking controller 130 determines turning radii of the vehicle 100 that enable the front corner 208 of the vehicle 100 to travel along the linear parking path 202. For example, the parking controller 130 determines the turning radii of the vehicle 100 that enable the vehicle 100 to transition from one orientation at one position along the linear parking path 202 to another orientation at another position along the linear parking path 202. The parking controller 130 may determine the turning radius associated with a particular position along the linear parking path 202 based on physical characteristics of the vehicle 100 such as the distance 114 between the front axle 110 and the rear axle 112, the width 120 of the vehicle 100, and/or the distance 118 between the front axle 110 and the front side 116 (e.g., the front corner 208). For example, the turning radius of the vehicle 100 varies to enable the front corner 208 to travel along the linear parking path 202 as the parking controller 130 autonomously turns the vehicle 100 into the perpendicular parking spot 102.

Figure 3:
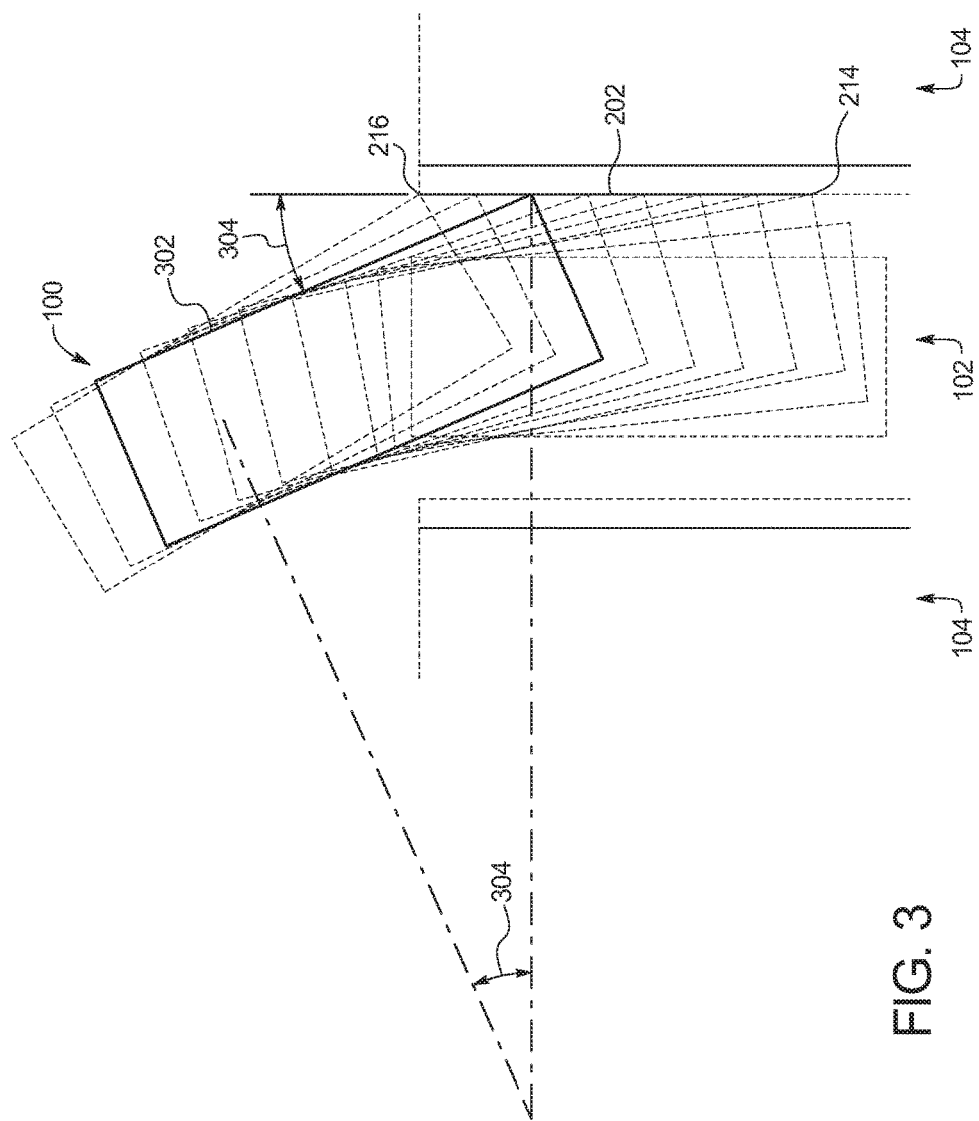
FIG. 3 also depicts the vehicle of FIG. 1 traveling along the linear parking path of FIG. 2.

FIG. 3 also depicts the vehicle 100 traveling along the linear parking path 202 and into the perpendicular parking spot 102 located between the other perpendicular parking spots 104. In FIG. 3, the vehicle 100 is positioned at a third intermediate position 302 along the linear parking path 202 that is between the first intermediate position 218 at the first end 214 and the second intermediate position 220 at the second end 216. At the third intermediate position 302, the vehicle 100 is oriented at an angle 304 relative to the linear parking path 202.

Further, the parking controller 130 utilizes Equation 1 provided below to determine the turning radius of the vehicle 100 at the third intermediate position 302 and the turning radii of the vehicle 100 at other positions (e.g., the first intermediate position 218, the second intermediate position 220) that enables the front corner 208 of the vehicle 100 to travel along the linear parking path 202 as the vehicle enters the perpendicular parking spot 102.

$$R(x) = \frac{WB + L_f - \tan\omega(x) \cdot VW/2}{\tan w(x)} \quad \text{Equation 1}$$

In Equation 1 provided above, x represents a position along the linear parking path 202 (e.g., the first intermediate position 218, the second intermediate position 220, the third intermediate position 302), R represents the turning radius at which the vehicle 100 is to turn at x, WB represents the distance 114 between the front axle 110 and the rear axle 112, $L_f$ represents the distance 118 between the front axle 110 and the front side 116, VW represents the width 120 of the vehicle 100, and ω represents an orientation of the vehicle relative to the linear parking path 202 at x (e.g., the angle 304 at the third intermediate position 302). For example, the parking controller 130 utilizes Equation 1 to determine the turning radius of the vehicle 100 at each position along the linear parking path 202 that enables the vehicle 100 to park at the target parking position 204 in single forward motion upon entering the perpendicular parking spot 102. In other examples, Equation 1 is utilized to generate data in a lookup table that the parking controller 130 queries to determine the turning radius of the vehicle 100 at each position along the linear parking path 202. Further, in other examples, the parking controller 130 utilizes Equation 1 and/or a look-up table to determine the turning radius of the vehicle 100 at each position along the linear parking path 202 to enable the vehicle 100 to autonomously turn the vehicle into the perpendicular parking spot 102 such that a rear corner of the vehicle 100 travels along the linear parking path 202 in a single reverse motion.

FIGS. 4-7 illustrate example approaching turn paths that enable the front corner 208 of the vehicle 100 to travel along the linear parking path 202 as the vehicle 100 travels within the perpendicular parking spot 102.

As disclosed in further detail above with respect to FIGS. 2-3, the parking controller 130 of the vehicle 100 detects the perpendicular parking spot 102 and determines the linear parking path 202 located within the perpendicular parking spot 102 along which the front corner 208 of the vehicle 100 is to travel. For example, the parking controller 130 detects the perpendicular parking spot 102 via the camera 122 and/or the sensor 124 of the vehicle 100. Further, to determine the linear parking path 202, the parking controller 130 determines the second end 216 of the linear parking path 202 at which the vehicle 100 is to be oriented at a vehicle orientation that enables entry of the vehicle 100 into the perpendicular parking spot 102 along the linear parking path 202.

The parking controller 130 of the vehicle 100 also determines an approaching turn path (e.g., an approaching turn path 402 of FIG. 4, an approaching turn path 502 of FIG. 5, an approaching turn path 602 of FIG. 6, an approaching turn path 702 of FIG. 7) to the second end 216 of the linear parking path 202. Upon determining the linear parking path 202 and the approaching turn path to the linear parking path 202, the parking controller 130 autonomously turns the vehicle 100 along the approaching turn path and the linear parking path 202 into the perpendicular parking spot 102.

The parking controller 130 determines the approaching turn path based upon a current position of the vehicle 100, a minimum turning radius of the vehicle 100, a location of the perpendicular parking spot, a vehicle orientation identified by the parking controller 130 at which the vehicle 100 is to be positioned at the second end 216 of the linear parking path 202 to enable the vehicle 100 to enter the perpendicular parking spot 102 along the linear parking path 202, and/or a surrounding environment of the vehicle 100 and the perpendicular parking spot 102. For example, the approaching turn path determined by the parking controller 130 is limited by the minimum turning radius of the vehicle 100 and/or position(s) of object(s) located near the vehicle 100 and/or perpendicular parking spot 102. Further, the parking controller 130 detects the current position of the vehicle 100 relative to the perpendicular parking spot 102 via the camera 122, the sensor 124, and/or the GPS receiver 128 of the vehicle 100.

In some examples, the approaching turn path to the linear parking path 202 includes a plurality of turning motions. That is, the approaching turn path to the second end 216 of the linear parking path 202 is a 2-point turn, a 3-point turn, etc. The parking controller 130 determines the approaching turn path to reduce the number of turning motions of approaching turn path and, thus, to reduce the number of turning motions the vehicle 100 is to perform to park within the perpendicular parking spot 102. In some examples, when there is a large amount of unobstructed space between the vehicle 100 and the perpendicular parking spot 102, the parking controller 130 is able to identify an approaching turn path that is a 1-point turn (e.g., a single forward motion, a single reverse motion). In other examples, when there is a small distance between and/or obstructions around the vehicle 100 and the perpendicular parking spot 102, the parking controller 130 identifies an approaching turn path that is a multi-point turn (e.g., a 2-point turn, a 3-point turn, etc.). That is, the parking controller 130 determines whether the approaching turn path is capable of being a 1-point turn, a 2-point turn, a 3-point turn, etc. based upon the current position of the vehicle 100, the identified vehicle orientation at the second end 216 of the linear parking path 202, the minimum turning radius of the vehicle 100, and/or the detected location(s) of nearby object(s).

Figure 4:
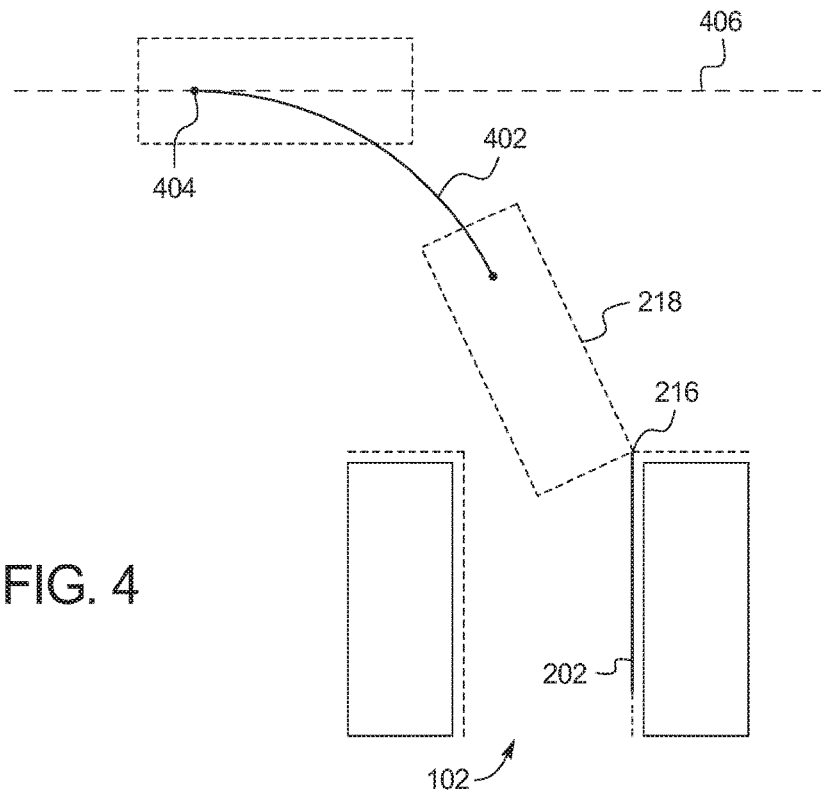
FIG. 4 depicts the vehicle of FIG. 1 traveling along an example turn path to the linear parking path of FIG. 2.

FIG. 4 depicts the vehicle 100 traveling along an example approaching turn path 402 to arrive at the linear parking path 202. In the illustrated example, the approaching turn path 402 is a 1-point turn. That is, the approaching turn path 402 includes a single (e.g., forward, reverse) turning motion. The approaching turn path 402 positions the vehicle 100 at the first intermediate position 218. In the first intermediate position 218, the vehicle is located at the second end 216 of the linear parking path 202 and is oriented in the identified vehicle orientation that enables the front corner 208 of the vehicle 100 to travel along the linear parking path 202.

Prior to determining the approaching turn path 402, the parking controller 130 determines whether an approaching turn path of the vehicle 100 is capable of being a 1-point turn (e.g., based upon a current position of the vehicle 100, the location of the perpendicular parking spot 102, an identified vehicle orientation at the second end 216 of the linear parking path 202, the minimum turning radius of the vehicle 100, location(s) of nearby object(s), etc.). In response to determining that an approaching turn path is not capable of being a 1-point turn, the parking controller 130 determines whether an approaching turn path is capable of being a 2-point turn. Otherwise, the parking controller 130 determines the approaching turn path 402 in response to identifying that an approaching turn path is capable of being a 1-point turn.

As illustrated in FIG. 4, the approaching turn path 402 begins at an initial turn point 404 and ends at the first intermediate position 218 at the second end 216 of the linear parking path 202. To determine the approaching turn path 402, the parking controller 130 identifies a path line 406, identifies the initial turn point 404 that is located along the path line 406, and determines an initial path from the current position of the vehicle 100 to the initial turn point 404. For example, the parking controller 130 determines the location of initial turn point 404 by identifying where the approaching turn path 402 and path line 406 intersect. In some examples, the path line 406 extends along a longitudinal axis of an initial position of the vehicle 100. In such examples, the initial path is a single forward or reverse motion that extends along the path line 406. Additionally or alternatively, the path line 406 is perpendicular to the perpendicular parking spot 102 and/or the initial path includes an s-curve turn that positions the vehicle 100 at the initial turn point 404.

The parking controller 130 determines the approaching turn path 402 by determining turning radii of the vehicle 100 that enable the vehicle 100 to travel from the initial turn point 404 to the first intermediate position 218. In some examples, the approaching turn path 402 includes a constant turning radius of the vehicle 100 that is greater than or equal to the minimum turning radius), In other examples, the approaching turn path 402 includes turning radii that vary for different positions along the approaching turn path 402. For example, the parking controller 130 may adjust the turning radius of the vehicle 100 (e.g., based upon information collected from the camera 122, the sensor 124, the GPS receiver 128, etc.) as the vehicle 100 travels along the approaching turn path 402 to adjust the approaching turn path 402.

Figure 5:
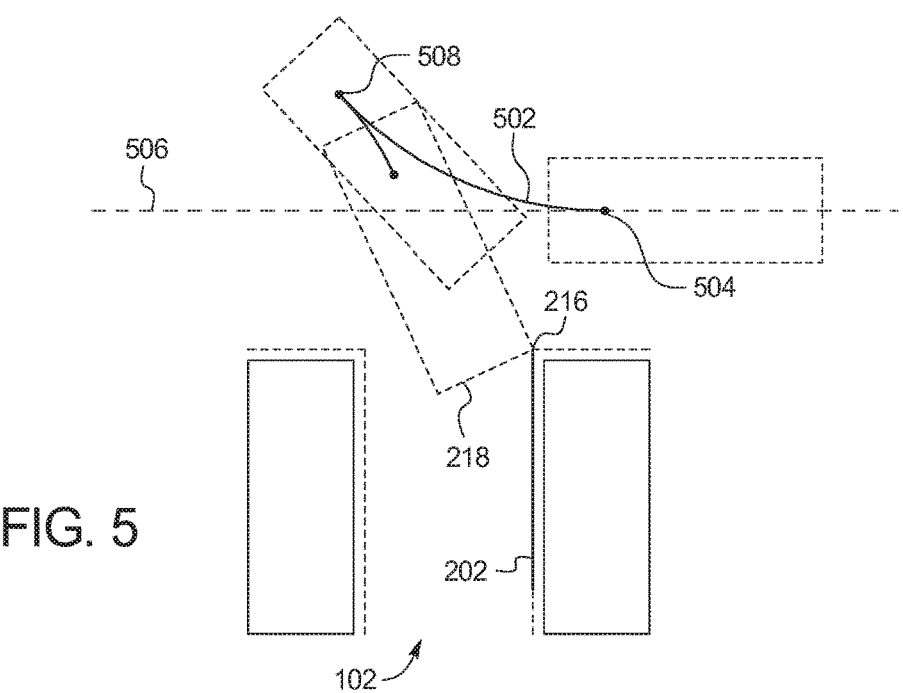
FIG. 5 depicts the vehicle of FIG. 1 traveling along another example turn path to the linear parking path of FIG. 2.

FIG. 5 depicts the vehicle 100 traveling along another example approaching turn path 502 to arrive at the linear parking path 202. In the illustrated example, the approaching turn path 502 is a 2-point turn in which the vehicle 100 moves in a reverse direction from an initial turn point 504 and subsequently moves in a forward direction to the perpendicular parking spot 102. In other examples, the 2-point turn of the approaching turn path 502 includes an initial forward motion and a subsequent reverse motion into the perpendicular parking spot 102. As illustrated in FIG. 5, the approaching turn path 502 positions the vehicle 100 at the first intermediate position 218. In the first intermediate position 218, the vehicle is located at the second end 216 of the linear parking path 202 and is oriented in the identified vehicle orientation that enables the front corner 208 of the vehicle 100 to travel along the linear parking path 202.

Prior to determining the approaching turn path 502, the parking controller 130 determines whether an approaching turn path of the vehicle 100 is capable of being a 2-point turn (e.g., based upon a current position of the vehicle 100, the location of the perpendicular parking spot 102, an identified vehicle orientation at the second end 216 of the linear parking path 202, the minimum turning radius of the vehicle 100, location(s) of nearby object(s), etc.). In response to determining that an approaching turn path is not capable of being a 2-point turn, the parking controller 130 determines whether an approaching turn path is capable of being a 3-point turn. Otherwise, the parking controller 130 determines the approaching turn path 502 in response to identifying that an approaching turn path is capable of being a 2-point turn.

As illustrated in FIG. 5, the approaching turn path 502 begins at the initial turn point 504 that is located along a path line 506, includes a reverse path along which the vehicle 100 moves in a reverse direction from the initial turn point 504 to an intermediate turn point 508, includes a forward path along which the vehicle 100 moves in a forward direction from the intermediate turn point 508 to the first intermediate position 218, and ends at the first intermediate position 218 at the second end 216 of the linear parking path 202. To determine the approaching turn path 502, the parking controller 130 identifies the path line 506, identifies the initial turn point 504 that is located along the path line 506, identifies the intermediate turn point 508, and determines an initial path from the current position of the vehicle 100 to the initial turn point 504. For example, the parking controller 130 determines the location of initial turn point 504 by identifying where the approaching turn path 502 and path line 506 intersect. In some examples, the path line 506 extends along a longitudinal axis of an initial position of the vehicle 100. In such examples, the initial path is a single forward or reverse motion that extends along the path line 506. Additionally or alternatively, the path line 506 is perpendicular to the perpendicular parking spot 102 and/or the initial path includes an s-curve turn that positions the vehicle 100 at the initial turn point 404.

The parking controller 130 determines the approaching turn path 502 by determining turning radii of the vehicle 100 that enable the vehicle 100 to travel from the initial turn point 504 to the first intermediate position 218. In some examples, a reverse-travel portion and/or a forward-travel portion of the approaching turn path 502 includes a constant turning radius of the vehicle 100 that is greater than or equal to the minimum turning radius), In other examples, the approaching turn path 502 includes turning radii that vary for different positions along the approaching turn path 502. For example, the parking controller 130 may adjust the turning radius of the vehicle 100 as the vehicle 100 travels along the approaching turn path 502 to adjust the approaching turn path 502. In some examples, the parking controller 130 determines subsequent portions of the approaching turn path 502 at turn points of the approaching turn path 502. For example, the parking controller 130 determines the turning radii of the reverse-travel portion of the approaching turn path 502 at the initial turn point 504 and (re)determines the turning radii of the forward-travel portion of the approaching turn path 502 at the intermediate turn point 508.

Figure 6:
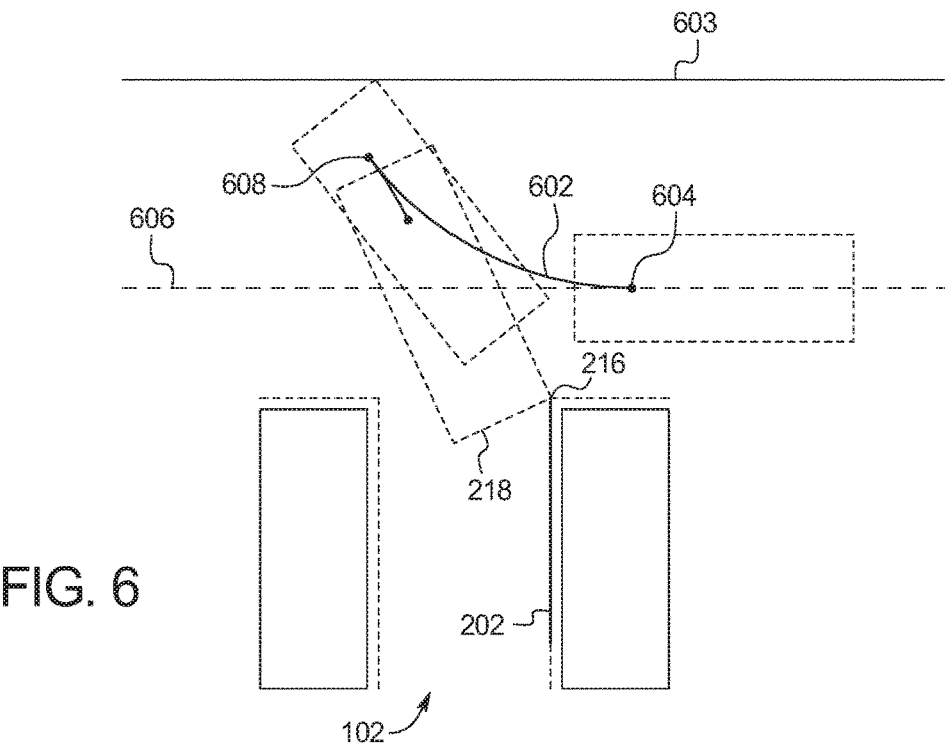
FIG. 6 depicts the vehicle of FIG. 1 traveling along another example turn path to the linear parking path of FIG. 2.

FIG. 6 depicts the vehicle 100 traveling along another example approaching turn path 602 to arrive at the linear parking path 202. In the illustrated example, the approaching turn path 602 is a 2-point turn in which the vehicle 100 moves in a reverse direction from an initial turn point 604 and subsequently moves in a forward direction to the perpendicular parking spot 102. In other examples, the 2-point turn of the approaching turn path 602 includes an initial forward motion and a subsequent reverse motion into the perpendicular parking spot 102. As illustrated in FIG. 6, the approaching turn path 602 positions the vehicle 100 at the first intermediate position 218. In the first intermediate position 218, the vehicle is located at the second end 216 of the linear parking path 202 and is oriented in the identified vehicle orientation that enables the front corner 208 of the vehicle 100 to travel along the linear parking path 202.

In the illustrated example, the parking controller 130 determines the approaching turn path to 602 avoid an object 603 (e.g., a wall, vehicle(s), garbage can(s), etc.) located near the vehicle 100 and the perpendicular parking spot 102. For example, the camera 122 and/or the sensor 124 of the vehicle 100 detects that the object 603 is near the vehicle 100 and the perpendicular parking spot 102, and the parking controller is 130 determines a location of the object 603 based on data collected from the camera 122 and/or the sensor 124.

As illustrated in FIG. 6, the approaching turn path 602 begins at an initial turn point 604 that is located along a path line 606, includes a reverse path along which the vehicle 100 moves in a reverse direction from the initial turn point 604 to an intermediate turn point 608, includes a forward path along which the vehicle 100 moves in a forward direction from the intermediate turn point 608 to the first intermediate position 218, and ends at the first intermediate position 218 at the second end 216 of the linear parking path 202. To determine the approaching turn path 402, the parking controller 130 identifies the path line 606, identifies the initial turn point 604 that is located along the path line 606, identifies the intermediate turn point 608, and determines an initial path from the current position of the vehicle 100 to the initial turn point 604. For example, the parking controller 130 determines the location of initial turn point 604 by identifying where the approaching turn path 602 and path line 606 intersect. In some examples, the path line 606 extends along a longitudinal axis of an initial position of the vehicle 100. In such examples, the initial path is a single forward or reverse motion that extends along the path line 606. Additionally or alternatively, the path line 606 is perpendicular to the perpendicular parking spot 102 and/or the initial path includes an s-curve turn that positions the vehicle 100 at the initial turn point 604. Further, the parking controller 130 of the illustrated example determines the initial turn point 604 and the intermediate turn point 608 such that the vehicle 100 avoids contacting the object 603 while traveling along the approaching turn path 602.

Figure 7:
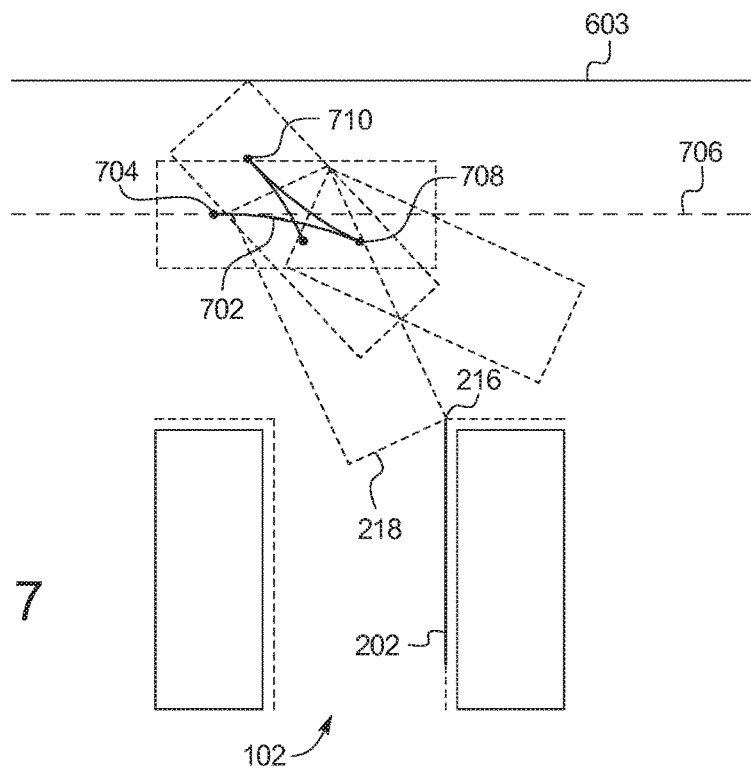
FIG. 7 depicts the vehicle of FIG. 1 traveling along another example turn path to the linear parking path of FIG. 2.

FIG. 7 depicts the vehicle 100 traveling along another example approaching turn path 702 to arrive at the linear parking path 202. In the illustrated example, the approaching turn path 702 is a 3-point turn in which the vehicle 100 moves in a first forward direction from an initial turn point 704, subsequently moves in a reverse direction, and subsequently moves in a second forward direction to the perpendicular parking spot 102. In other examples, the 3-point turn of the approaching turn path 502 includes an initial reverse motion, a forward motion, and a subsequent reverse motion into the perpendicular parking spot 102. As illustrated in FIG. 5, the approaching turn path 702 positions the vehicle 100 at the first intermediate position 218. In the first intermediate position 218, the vehicle is located at the second end 216 of the linear parking path 202 and is oriented in the identified vehicle orientation that enables the front corner 208 of the vehicle 100 to travel along the linear parking path 202.

Prior to determining the approaching turn path 702, the parking controller 130 determines whether an approaching turn path of the vehicle 100 is capable of being a 3-point turn (e.g., based upon a current position of the vehicle 100, the location of the perpendicular parking spot 102, an identified vehicle orientation at the second end 216 of the linear parking path 202, the minimum turning radius of the vehicle 100, the location of the object 603, etc.). In response to determining that an approaching turn path is not capable of being a 3-point turn, the parking controller 130 determines whether an approaching turn path is capable of being a 4-point turn and/or any other multi-point turn. Otherwise, the parking controller 130 determines the approaching turn path 702 in response to identifying that an approaching turn path is capable of being a 3-point turn.

As illustrated in FIG. 7, the approaching turn path 702 begins at the initial turn point 704 that is located along a path line 706, includes a first forward path along which the vehicle 100 moves in a forward direction from the initial turn point 704 to an intermediate turn point 708 (e.g., a first intermediate turn point), includes a reverse path along which the vehicle 100 moves in a reverse direction from the intermediate turn point 708 to another intermediate turn point 710 (e.g., a second intermediate turn point), and includes a second forward path along which the vehicle moves in a forward direction from the intermediate turn point 710 to the first intermediate position 218, and ends at the first intermediate position 218 at the second end 216 of the linear parking path 202. To determine the approaching turn path 702, the parking controller 130 identifies the path line 706, identifies the initial turn point 704 that is located along the path line 706, identifies the intermediate turn point 708 and the intermediate turn point 710, and determines an initial path from the current position of the vehicle 100 to the initial turn point 704. For example, the parking controller 130 determines the initial turn point 704, the intermediate turn point 708, and the intermediate turn point 710 such that the vehicle 100 avoids contacting the object 603 while traveling along the approaching turn path 702. In some examples, the path line 706 extends along a longitudinal axis of an initial position of the vehicle 100. In such examples, the initial path is a single forward or reverse motion that extends along the path line 706. Additionally or alternatively, the path line 706 is perpendicular to the perpendicular parking spot 102 and/or the initial path includes an s-curve turn that positions the vehicle 100 at the initial turn point 704.

The parking controller 130 determines the approaching turn path 702 by determining turning radii of the vehicle 100 that enable the vehicle 100 to travel from the initial turn point 704 to the first intermediate position 218. In some examples, a reverse-travel portion and/or a forward-travel portion of the approaching turn path 702 includes a constant turning radius of the vehicle 100 that is greater than or equal to the minimum turning radius), In other examples, the approaching turn path 702 includes turning radii that vary for different positions along the approaching turn path 702. For example, the parking controller 130 may adjust the turning radius of the vehicle 100 as the vehicle 100 travels along the approaching turn path 702 to adjust the approaching turn path 702. In some examples, the parking controller 130 determines subsequent portions of the approaching turn path 702 at turn points of the approaching turn path 702. For example, the parking controller 130 determines the turning radii of a first forward-travel portion of the approaching turn path 702 at the initial turn point 704, (re)determines the turning radii of a reverse-travel portion of the approaching turn path 702 at the intermediate turn point 708, and (re)determines the turning radii of a second forward-travel portion of the approaching turn path 702 at the intermediate turn point 710.

In the illustrated examples, the parking controller 130 determines the approaching turn paths 402, 502, 602, 702 to enable the vehicle 100 to travel along linear parking path 202 within the perpendicular parking spot 102. In other examples, the parking controller 130 may determine an approaching turn path (e.g., one of the approaching turn paths 402, 502, 602, 702) to enable the vehicle 100 to travel along another parking path within the perpendicular parking spot 102. In such examples, the parking controller 130 determines the approaching turn path based upon a current position of the vehicle 100, a minimum turning radius of the vehicle 100, a location of the perpendicular parking spot 102, a surrounding environment of the vehicle 100 and the perpendicular parking spot 102. and/or a vehicle orientation at which the vehicle 100 is to be positioned at an end of the other parking path to enable the vehicle 100 to enter the perpendicular parking spot 102 along that other parking path.

Figure 8:
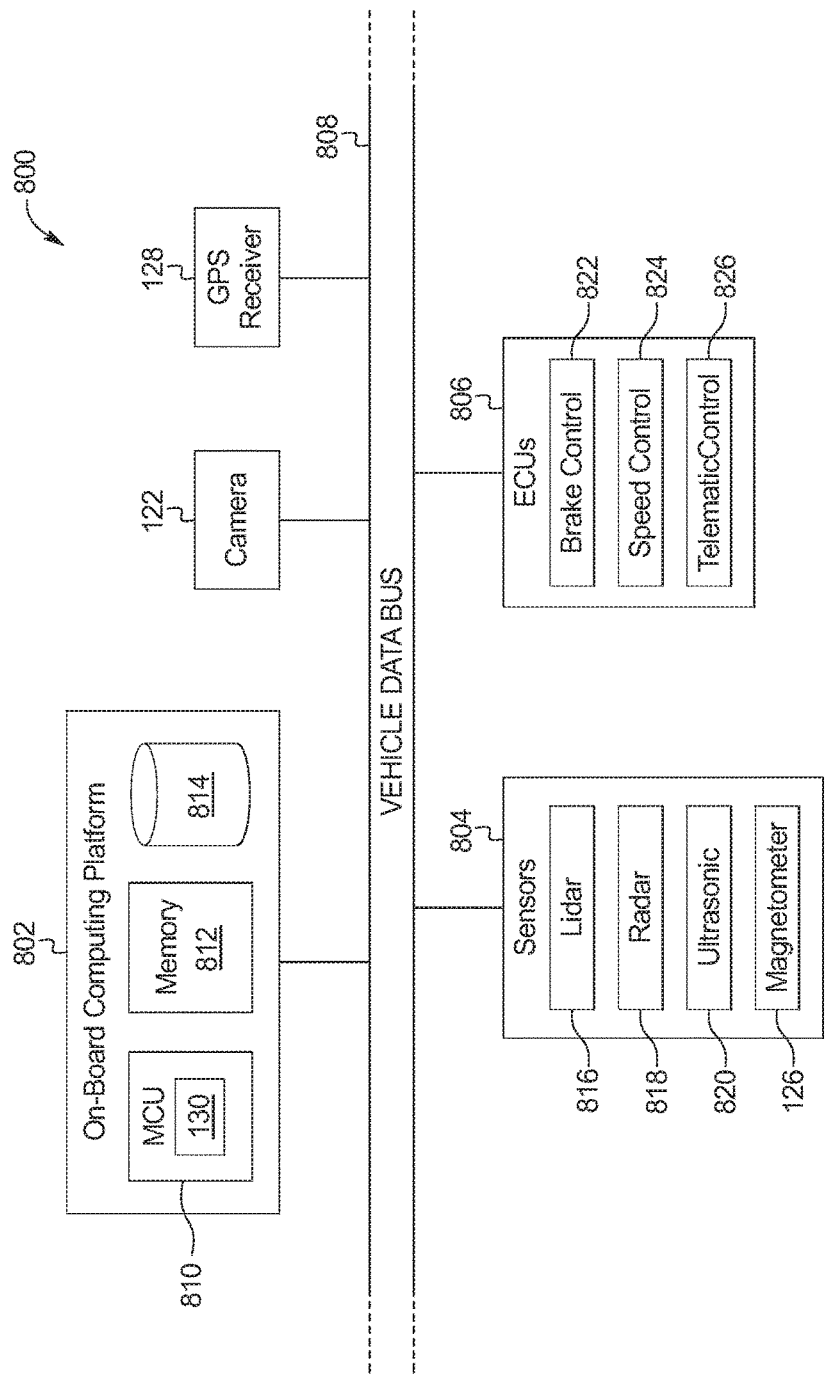
FIG. 8 is a block diagram of electronic components of the vehicle of FIG. 1.

FIG. 8 is a block diagram of electronic components 800 of the vehicle 100. As illustrated in FIG. 8, the electronic components 800 include an on-board computing platform 802, the camera 122, the GPS receiver 128, sensors 804, electronic control units (ECUs) 806, and a vehicle data bus 808.

The on-board computing platform 802 includes a microcontroller unit, controller or processor 810, memory 812, and a database 814. In some examples, the processor 510 of the on-board computing platform 802 is structured to include the parking controller 130. Alternatively, in some examples, the parking controller 130 is incorporated into another electronic control unit (ECU) with its own processor 810 and memory 812. The processor 810 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 812 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 812 includes multiple kinds of memory, particularly volatile memory and non-volatile memory.

The memory 812 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 812, the computer readable medium, and/or within the processor 810 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In some examples, the parking controller 130 and/or the processor 810 calculates orientations at which the vehicle 100 is to be positioned at respective locations as the vehicle 100 approaches the target parking position 204 (e.g., as the front corner 208 of the vehicle 100 travels along the linear parking path 202). Additionally or alternatively, the parking controller 130 and/or the processor 810 queries a lookup table of the database 814 to identify orientations at which the vehicle 100 is to be positioned at respective locations as the vehicle 100 approaches the target parking position 204. For example, the lookup table of the database 814 may enable the parking controller 130 and/or the processor 810 to identify an orientation of the vehicle 100 at a particular location along the linear parking path 202 based on the length 212 of the linear parking path 202, the target parking position 204 within the perpendicular parking spot 102, and the minimum turning radius of the vehicle 100.

The sensors 804 are arranged in and around the vehicle 100 to monitor properties of the vehicle 100 and/or an environment in which the vehicle 100 is located. One or more of the sensors 804 may be mounted to measure properties around an exterior of the vehicle 100. Additionally or alternatively, one or more of the sensors 804 may be mounted inside a cabin of the vehicle 100 or in a body of the vehicle 100 (e.g., an engine compartment, wheel wells, etc.) to measure properties in an interior of the vehicle 100. For example, the sensors 804 include accelerometers, odometers, tachometers, pitch and yaw sensors, wheel speed sensors, microphones, tire pressure sensors, biometric sensors and/or sensors of any other suitable type.

In the illustrated example, the sensors 804 include a lidar sensor 816, a radar sensor 818, an ultrasonic sensor 820, and the magnetometer 126. For example, the sensor 124 of the vehicle 100 that may be utilized to detect the perpendicular parking spot 102, the outer boundary 206 of the perpendicular parking spot 102, and/or the target parking position 204 within the perpendicular parking spot 102 includes the lidar sensor 816, the radar sensor 818, and/or the ultrasonic sensor 820. The lidar sensor 816 detects and locates an object (e.g., the perpendicular parking spot 102) via lasers, the radar sensor 818 detects and locates the object via radio waves, and the ultrasonic sensor 820 detects and locates the object via ultrasound waves. Further, the magnetometer 126 measures the magnetic orientation of the vehicle 100 as the turns into the perpendicular parking spot 102.

The ECUs 806 monitor and control the subsystems of the vehicle 100. For example, the ECUs 806 are discrete sets of electronics that include their own circuit(s) (e.g., integrated circuits, microprocessors, memory, storage, etc.) and firmware, sensors, actuators, and/or mounting hardware. The ECUs 806 communicate and exchange information via a vehicle data bus (e.g., the vehicle data bus 808). Additionally, the ECUs 806 may communicate properties (e.g., status of the ECUs 806, sensor readings, control state, error and diagnostic codes, etc.) to and/or receive requests from each other. For example, the vehicle 100 may have seventy or more of the ECUs 806 that are positioned in various locations around the vehicle 100 and are communicatively coupled by the vehicle data bus 808. In the illustrated example, the ECUs 806 include a brake control module 822, a speed control unit 824, and a telematic control unit 826. For example, the brake control module 822 autonomously operate brakes of the vehicle 100, and the speed control unit 824 autonomously controls a speed at which the vehicle 100 travels. In some examples, the brake control module 822 and the speed control unit 824 receive signals from the processor 810 of the on-board computing platform 802 to control the brakes and the speed, respectively, of the vehicle 100. Further, the telematic control unit 826 controls tracking of the vehicle 100, for example, utilizing data received by the GPS receiver 128 of the vehicle 100.

The vehicle data bus 808 communicatively couples the camera 122, the GPS receiver 128, the on-board computing platform 802, the sensors 804, and the ECUs 806. In some examples, the vehicle data bus 808 includes one or more data buses. The vehicle data bus 808 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 9:
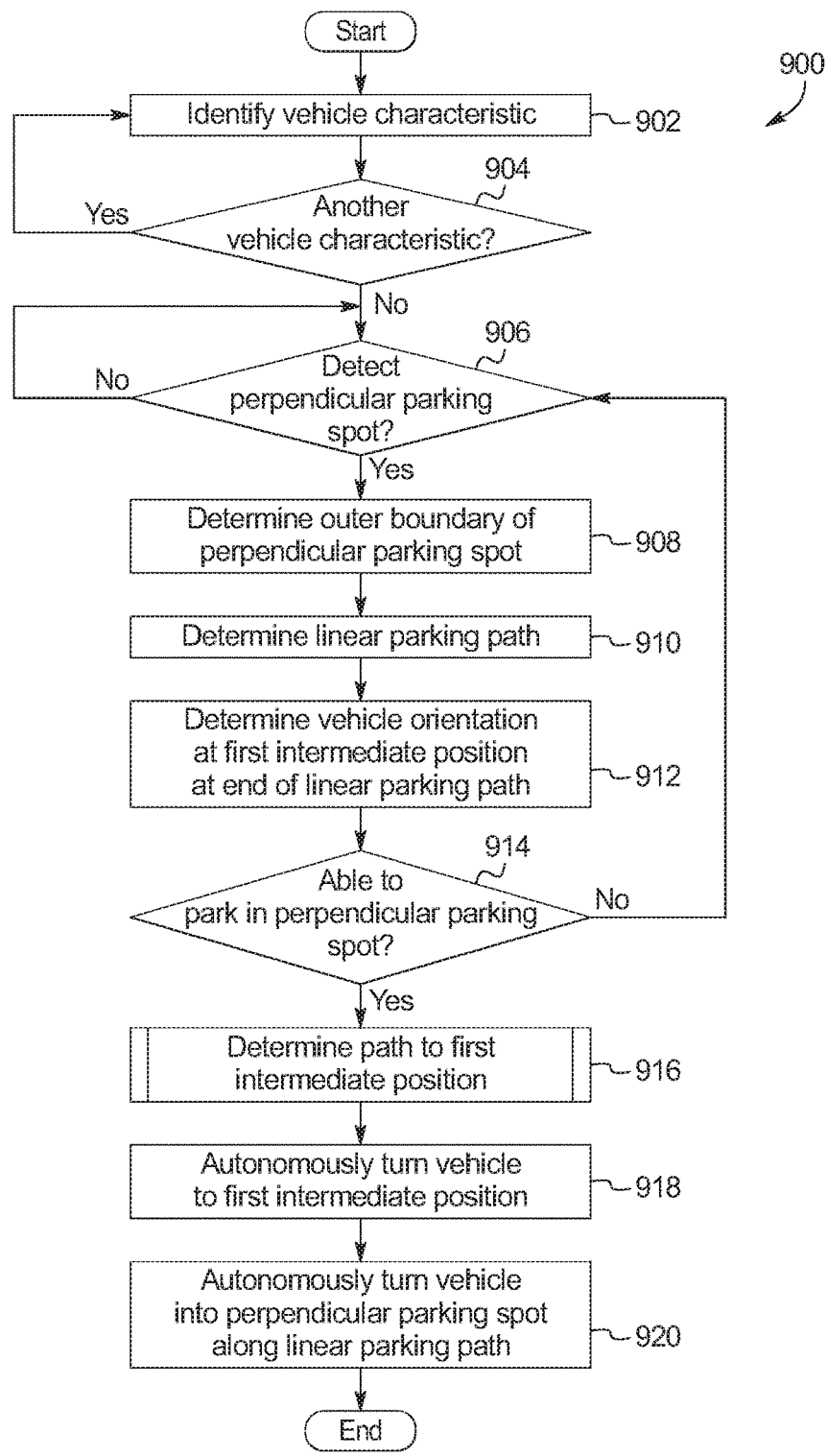
FIG. 9 is a flowchart for autonomously parking a vehicle in a perpendicular parking spot by traveling along an approaching turn path and a subsequent linear parking path in accordance with the teachings herein.

FIG. 9 is a flowchart of an example method 900 to autonomously park a vehicle in a perpendicular parking spot by traveling along an approaching turn path and a subsequent linear parking path. The flowchart of FIG. 9 is representative of machine readable instructions that are stored in memory (such as the memory 812 of FIG. 8) and include one or more programs which, when executed by a processor (such as the processor 810 of FIG. 8), cause the vehicle 100 to implement the example parking controller 130 of FIGS. 1 and 8. While the example program is described with reference to the flowchart illustrated in FIG. 9, many other methods of implementing the example parking controller 130 may alternatively be used. For example, the order of execution of the blocks may be rearranged, changed, eliminated, and/or combined to perform the method 900. Further, because the method 900 is disclosed in connection with the components of FIGS. 1-8, some functions of those components will not be described in detail below.

Initially, at block 902, the parking controller 130 determines a characteristic of the vehicle 100. For example, the parking controller 130 determines the distance 114 between the front axle 110 and the rear axle 112. At block 904, the parking controller 130 identifies whether there is another characteristic of the vehicle 100 to determine. In response to determining that there is another characteristic to determine, the parking controller 130 repeats blocks 902, 904 until no other characteristics are identified. For example, the parking controller 130 repeats blocks 902, 904 to determine the distance 118 between the front axle 110 and the front side 116 (e.g., the front corner 208), the width 120 of the vehicle 100, the minimum turning radius, etc.

At block 906, the parking controller 130 determines, via the camera 122 and/or the sensor 124, whether an available or open perpendicular parking spot is detected. In response to the parking controller 130 not detecting an available perpendicular parking spot, block 906 is repeated. In response to the parking controller 130 detecting an available perpendicular parking spot (e.g., the perpendicular parking spot 102), the method 900 proceeds to block 908 at which the parking controller 130 determines the outer boundary 206 of the perpendicular parking spot 102 via the camera 122 and/or the sensor 124. Further, the parking controller 130 determines the target parking position 204 within the perpendicular parking spot 102 at which the vehicle 100 is to be parked. At block 910, the parking controller 130 determines the linear parking path 202 along which the front corner 208 of the vehicle 100 is to travel as the vehicle 100 approaches the target parking position 204 in a single forward motion upon entering the perpendicular parking spot 102. For example, the parking controller 130 determines the linear parking path 202 based on the outer boundary 206 of the perpendicular parking spot 102 and the target parking position 204 locate within the perpendicular parking spot 102.

At block 912, the parking controller 130 determines a vehicle orientation at the first intermediate position 218 located at the second end 216 of the linear parking path 202 that enables the front corner 208 of the vehicle 100 to travel along the linear parking path 202. Further, the parking controller 130 determines other orientations at which the vehicle 100 is to be positioned at other locations along the linear parking path 202. For example, parking controller 130 determines an orientation of the vehicle 100 at a corresponding position based on the target parking position 204, the minimum turning radius of the vehicle 100, and/or the length 212 of the linear parking path 202. Additionally, the parking controller 130 determines turning radii that enable the front corner 208 of the vehicle 100 to travel along the linear parking path 202. That is, the turning radii determined by the parking controller 130 enable the vehicle 100 to transition from one orientation at one position along the linear parking path 202 to another orientation at another position along the linear parking path 202 as the front corner 208 travels along the linear parking path 202.

At block 914, the parking controller 130 determines whether the vehicle 100 is able to be parked in the perpendicular parking spot 102. For example, the parking controller 130 determines whether the vehicle 100 is able to approach the linear parking path 202 in such a manner that enables the front corner 208 of the vehicle 100 to travel along linear parking path 202. In response to the parking controller 130 determining that the vehicle 100 is unable to be parked in the perpendicular parking spot 102, the method 900 returns to block 906. Otherwise, in response to the parking controller 130 determining that the vehicle 100 is able to be parked in the perpendicular parking spot 102, the method 900 proceeds to block 916.

At block 916, the parking controller 130 determines an approaching turn path (e.g., the approaching turn path 402 of FIG. 4, the approaching turn path 502 of FIG. 5, the approaching turn path 602 of FIG. 6, the approaching turn path 702 of FIG. 7) to the first intermediate position 218 that enables the front corner 208 of the vehicle 100 to travel along the linear parking path 202. For example, as disclosed in further detail below with respect to FIG. 10, the parking controller 130 determines the approaching turn path based upon a current vehicle position of the vehicle 100, the vehicle orientation at the first intermediate position 218, and the minimum turning radius of the vehicle 100.

At block 918, the parking controller 130 autonomously turns the vehicle 100 along the approaching turn path to the first intermediate position 218 at the second end 216 of the linear parking path 202. Further, at block 920, the parking controller 130 autonomously turns the vehicle 100 into the perpendicular parking spot 102 along the linear parking path 202 in a single forward motion.

Figure 10:
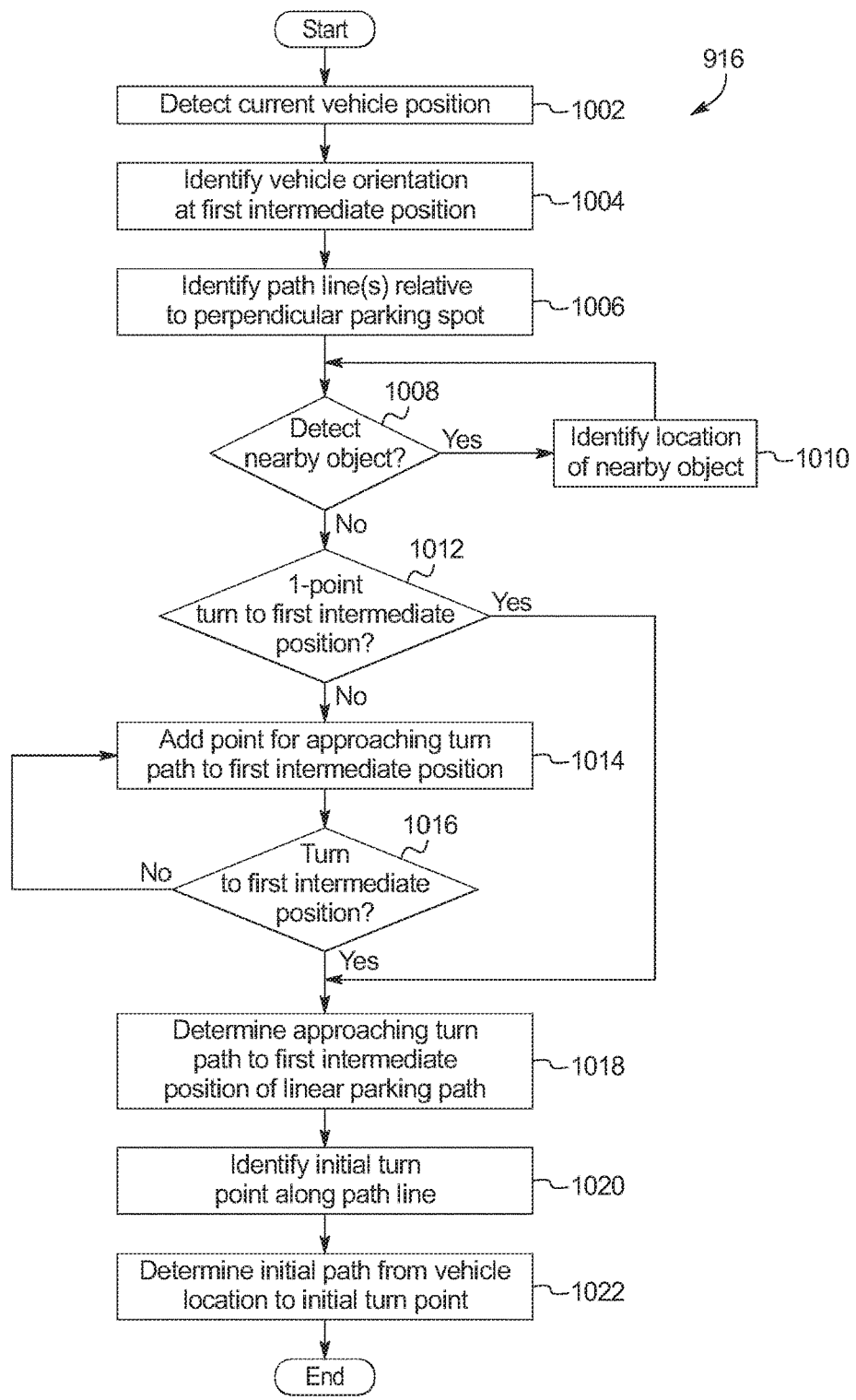
FIG. 10 is flowchart for autonomously turning a vehicle along an approaching turn path to a linear parking path within a perpendicular parking spot in accordance with the teachings herein.

FIG. 10 is a flowchart of an example method 916 to perform block 916 of FIG. 8 to autonomously turn a vehicle along an approaching turn path to a linear parking path within a perpendicular parking spot. The flowchart of FIG. 10 is representative of machine readable instructions that are stored in memory (such as the memory 812 of FIG. 8) and include one or more programs which, when executed by a processor (such as the processor 810 of FIG. 8), cause the vehicle 100 to implement the example the parking controller 130 of FIGS. 1 and 8. While the example program is described with reference to the flowchart illustrated in FIG. 10, many other methods of implementing the example parking controller 130 may alternatively be used. For example, the order of execution of the blocks may be rearranged, changed, eliminated, and/or combined to perform the method 916. Further, because the method 916 is disclosed in connection with the components of FIGS. 1-8, some functions of those components will not be described in detail below.

Initially, at block 1002, the parking controller 130 determines a current position of the vehicle 100. For example, the parking controller 130 determines the current position of the vehicle 100 relative to the perpendicular parking spot 102 and/or the first intermediate position 218 via the camera 122, the sensor 124, and/or the GPS receiver 128. At block 1004, the parking controller 130 identifies the vehicle orientation at the vehicle 100 is to be positioned at the first intermediate position 218 that enables the vehicle 100 to enter the perpendicular parking spot 102 along the linear parking path 202. At block 1006, the parking controller 130 identifies one or more path lines (e.g., the path line 406 of FIG. 4, the path line 506 of FIG. 5, the path line 606 of FIG. 6, the path line 706 of FIG. 7) relative to the perpendicular parking spot 102. In some examples, the path line(s) extend along a longitudinal axis of an initial position of the vehicle 100. Further, in some examples, the path line(s) are perpendicular to the perpendicular parking spot 102.

At block 1002, the parking controller 130 determines whether a nearby object. For example, the parking controller 130 detects object(s) located near the vehicle 100 and/or the perpendicular parking spot 102 via the camera 122 and/or the sensor 124 of the vehicle 100. In response to the parking controller 130 determining that a nearby object is detected, the method 916 proceeds to block 1010 at which the parking controller 130 identifies a location of the nearby location based upon data collected via the camera 122 and/or the sensor 124. After the parking controller 130 identifies the location of the nearby location at block 1010, the method 916 returns to block 1008 to determine whether there is another nearby object. Further, in response to the parking controller 130 determining at block 1008 that a nearby object is not detected, the method 916 proceeds to block 1012.

At block 1012, the parking controller 130 determines whether there is a 1-point turn that enables the vehicle 100 to arrive at the first intermediate position 218 in the vehicle orientation that enables the front corner 208 of the vehicle 100 to travel along the linear parking path 202. That is, the parking controller 130 determines whether the approaching turn path is capable of being a 1-point turn. In some examples, the parking controller 130 determines whether the approaching turn path is to a 1-point turn based on the vehicle orientation at the first intermediate position 218, the current position of the vehicle 100, and/or location(s) of nearby object(s). For example, the parking controller 130 determines whether there is a 1-point turn to the first intermediate position 218 that enables the vehicle 100 to avoid nearby object(s). In response to the parking controller 130 determining that a 1-point turn enables the vehicle 100 to arrive at the first intermediate position 218 in the vehicle orientation, the method proceeds to block 1018. Otherwise, in response to the parking controller 130 determining that a 1-point turn does not enable the vehicle 100 to arrive at the first intermediate position 218 in the vehicle orientation, the method proceeds to block 1014.

At block 1014, the parking controller 130 adds a turn point for the approaching turn path to the first intermediate position 218. For example, the parking controller 130 adds a turn point to form a 2-point turn from the 1-point turn. At block 1016, the parking controller 130 determines whether there is an approaching turning path having the revised number of turn points (e.g., a 2-point turn) that enables the vehicle 100 to arrive at the first intermediate position 218 in the vehicle orientation for travel along the linear parking path 202. That is, upon determining that there is not a 1-point turn that enables the vehicle 100 to arrive in the vehicle orientation at the first intermediate position, the parking controller 130 determines whether there is a 2-point turn that enables the vehicle 100 to arrive in the vehicle orientation at the first intermediate position. In response to the parking controller 130 determining that there is not an approaching turning path having the revised number of turn points, the method 916 returns to block 1014 to add another turn point to the approaching turning path. Otherwise, in response to determining that there is an approaching turning path having the revised number of turn points, the method 916 proceeds to block 1018.

At block 1018, the parking controller 130 determines the approaching turn path that enables the vehicle to the vehicle 100 to arrive at the first intermediate position 218 in the vehicle orientation for travel along the linear parking path 202. At block 1020, the parking controller 130 identifies an initial turn point (e.g., the initial turn point 404 of FIG. 4, the initial turn point 504 of FIG. 5, the initial turn point 604 of FIG. 6, the initial turn point 704 of FIG. 7) of the approaching turn path that is located along one of the line path(s) identified at block 1006. That is, the parking controller 130 determines where the approaching turn path and one of the line path(s) intersect to identify the initial turn point for the vehicle 100. At block 1022, the parking controller 130 determines an initial path from the current location of the vehicle to the initial turn point of the approaching turn path. In some examples, the initial path is a single forward or reverse motion along the path line that includes the initial turn point. In some examples, the initial path includes an s-curve turn that positions the vehicle 100 at the initial turn point.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a front corner;
   a sensor; and
   a parking controller to:
   detect, via the sensor, a perpendicular parking spot;
   determine a linear parking path located within the perpendicular parking spot along which the front corner is to travel;
   determine an approaching turn path to the linear parking path; and
   autonomously turn along the approaching turn path and the linear parking path into the perpendicular parking spot.

2. The vehicle of claim 1, wherein the sensor is selected from the group consisting of a radar sensor, a lidar sensor, and an ultrasonic sensor.

3. The vehicle of claim 1, wherein the sensor is to detect an object near the perpendicular parking spot.

4. The vehicle of claim 3, wherein the parking controller is to determine a location of the object near the perpendicular parking spot.

5. The vehicle of claim 4, wherein the parking controller determines the approaching turn path to avoid the object near the perpendicular parking spot.

6. The vehicle of claim 1, further including a camera to detect at least one of the perpendicular parking spot and an object near the perpendicular parking spot.

7. The vehicle of claim 1, wherein the approaching turn path determined by the parking controller is limited by a minimum turning radius.

8. The vehicle of claim 1, wherein, to determine the linear parking path, the parking controller is to determine an end of the linear parking path at which a vehicle orientation enables entry into the perpendicular parking spot along the linear parking path.

9. The vehicle of claim 1, wherein, to determine the approaching turn path, the parking controller detects a current vehicle position and identifies a vehicle orientation at an end of the linear parking path that enables entry into the perpendicular parking spot along the linear parking path.

10. The vehicle of claim 9, wherein the parking controller identifies a path line relative to the perpendicular parking spot and along which an initial turn point of the approaching turn path is located.

11. The vehicle of claim 10, wherein the parking controller determines whether the approaching turn path is capable of being a 1-point turn based upon the current vehicle position and the vehicle orientation at the end of the linear parking path.

12. The vehicle of claim 11, wherein, responsive to determining the approaching turn path is capable of being a 1-point turn, the parking controller:
    determines the approaching turn path as a 1-point turn from the path line to the vehicle orientation at the end of the linear parking path;
    identifies the initial turn point along the path line; and
    determines an initial path from the current vehicle position to the initial turn point.

13. The vehicle of claim 11, wherein, responsive to determining the approaching turn path is not capable of being a 1-point turn, the parking controller determines whether the approaching turn path is capable of being a 2-point turn based upon the current vehicle position and the vehicle orientation at the end of the linear parking path.

14. The vehicle of claim 13, wherein, responsive to determining the approaching turn path is capable of being a 2-point turn, the parking controller:
    determines the approaching turn path as a 2-point turn from the path line to the vehicle orientation at the end of the linear parking path;
    identifies the initial turn point along the path line; and
    determines an initial path from the current vehicle position to the initial turn point.

15. The vehicle of claim 13, wherein, responsive to determining the approaching turn path is not capable of being a 2-point turn, the parking controller determines whether the approaching turn path is capable of being a 3-point turn based upon the current vehicle position and the vehicle orientation at the end of the linear parking path.

16. The vehicle of claim 15, wherein, responsive to determining the approaching turn path is capable of being a 3-point turn, the parking controller:

determines the approaching turn path as a 3-point turn from the path line to the vehicle orientation at the end of the linear parking path;

identifies the initial turn point along the path line; and determines an initial path from the current vehicle position to the initial turn point.

17. A method comprising:

detecting a perpendicular parking spot via a camera of a vehicle;

determining, via a processor, a linear parking path located within the perpendicular parking spot along which a front corner of the vehicle is to travel;

determining, via the processor, an approaching turn path to the linear parking path; and autonomously turning along the approaching turn path and the linear parking path into the perpendicular parking spot.

18. The method of claim 17, further including:

detecting, via the camera, an object near the perpendicular parking spot;

identifying a location of the object; and determining the approaching turn path to avoid the object.

19. The method of claim 17, further including:

detecting a current vehicle position; and identifying a vehicle orientation at an end of the linear parking path that enables entry into the perpendicular parking spot along the linear parking path.

20. The method of claim 19, further including determining whether the approaching turn path is capable of being at least one of a 1-point turn, a 2-point turn, and a 3-point turn based upon the current vehicle position, the vehicle orientation at the end of the linear parking path, and a minimum turning radius of the vehicle.

* * * * *